Aug. 17, 1926.
T. MORINELLI
1,596,444
SELF FILLING PNEUMATIC CYLINDER AND PISTON
Filed Jan. 15, 1926
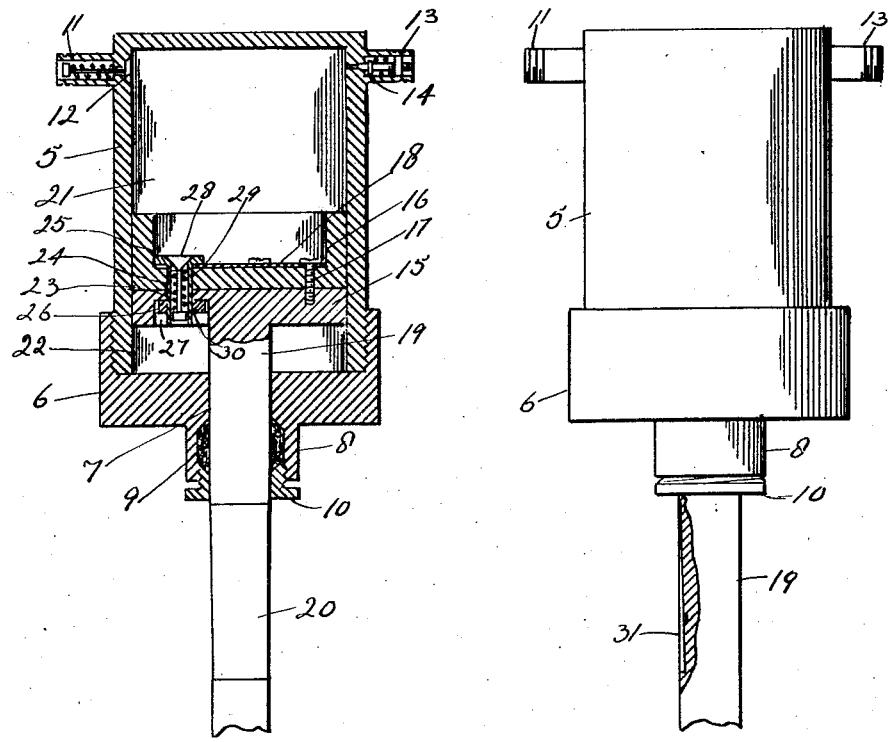
INVENTOR
Thomas Morinelli
By W. W. Williamson Atty.

Patented Aug. 17, 1926.

1,596,444

UNITED STATES PATENT OFFICE.

THOMAS MORINELLI, OF PHILADELPHIA, PENNSYLVANIA.

SELF-FILLING PNEUMATIC CYLINDER AND PISTON.

Application filed January 15, 1926. Serial No. 81,455.

My invention relates to new and useful improvements in a self filling pneumatic cylinder and piston, and has for its primary object to provide an exceedingly simple and effective device of this character whereby the cylinder will be automatically filled with air to the desired pressure during operation thereby overcoming the necessity of supplying the same with compressed air, and eliminating the possibility of the pressure decreasing unknown to the user.

Another object of this invention is to provide means for relieving excess pressure which under some condition might accumulate within the cylinder.

A further object of the invention is to arrange a piston within a cylinder so as to divide the latter into two compartments, one compartment first receiving the air and then being transferred thru a valve passage into the main compartment where its action upon the piston takes place.

A still further object of the invention is to provide unique methods and structures for the admission of air into the auxiliary chamber.

While I have designated this device primarily for use in connection with resilient wheels where one of the cylinders and pistons takes the place of each wheel spoke, it is also adapted for many other and kindred uses, such as shock absorbers, bumpers and vehicle suspension means.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a longitudinal sectional view of a self filling pneumatic cylinder and piston constructed in accordance with my invention with a portion of the piston rod remaining in elevation.

Fig. 2, is a side elevation of such a device with a portion of the piston rod in section to show another method of admitting air to the auxiliary chamber.

In carrying out my invention as herein embodied, 5 represents the body of the cylinder having an open end normally closed by a cap 6, which is provided with a central opening 7 for the passage of a piston rod, and said opening is surrounded by a packing receiver 8 to hold a suitable packing which latter is compressed and held in place by the gland 10.

If found desirable, an inlet valve casing 11 may be secured to the cylinder to house the spring controlled valve 12, by which air may be forced into the cylinder thru the medium of a pump in a manner similar to that used for filling the pneumatic tires of automobiles. Also, if found desirable, the cylinder may be provided with a relief valve casing 13, in which is a spring actuated valve 14 so that should the pressure within the cylinder exceed the tension of the spring of the relief valve, such excess pressure will be blown off or forced thru the relief valve, and the location of either of these valves is immaterial.

Within the cylinder is a reciprocating piston 15, preferably having a cup washer 16 of suitable material, such as leather, or rubber, fastened thereto in any well-known or approved manner, as by screws 17, with a metallic washer 18 interposed between their heads and the base of the cup washer. The piston is provided with a piston rod 19 passing thru the opening 7 in the end of the cylinder, and this piston rod has an intermediate tapered portion 20 so that the diameter of the piston rod decreases outwardly, thereby providing a space between the walls of the tapered portion of the piston rod and the surrounding edge of the end of the cylinder in the region of the opening 7 when the piston and its rod have moved inwardly a sufficient distance to bring the tapered portion of said rod within the confines of the cylinder end.

The piston divides the interior of the cylinder into two compartments, one of which I term the main or primary compartment 21, and other other the auxiliary compartment 22 so that as the piston moves inward, and the tapered portion of the rod passes the inner face of the cylinder end, atmospheric air will be drawn into the auxiliary chamber about the tapering portion of the rod, and during the outward movement of the pistion, the opening 7 will be closed, and the air within the auxiliary chamber will pass thru a valve-controlled passageway 23 formed in the piston and, altho I do not limit myself to the particular construction of the valve in this passageway, for convenience, I have illustrated it as including a valve casing 24, mounted in the passage way and having a flange or head 25 engaging one of the faces of the piston, as a whole, with a nut 26, a screw threaded on the other end to hold it in place, and that end of the valve casing and component part at the outer face of the piston is set in a countersink 27. Within the casing is the valve 28 provided with a stem 29, which valve is normally held in the closed position by the spring 30.

In place of the tapered portion of the piston rod for admitting air to the auxiliary chamber, a longitudinal groove 31, Fig. 2, may be formed in the piston rod in such a position that when the piston moves inward, said groove will extend beyond both faces of the end of the cylinder.

From the foregoing description, it will be seen that each time the piston moves inward, a passageway for air to the auxiliary chamber will be opened, and when moving outward, this passageway will be closed and the air trapped in said auxiliary chamber; after which further outward movement of the latter will cause the air to pass thru the valve-controlled passageway 23 into the primary chamber 21, and then any inward movement of the piston or opposite movement of the cylinder will be checked by the air as it is compressed within the primary chamber. After the air in the primary chamber has accumulated to such an extent as to prevent opening of the valve 28, no more air will be transferred from the auxiliary chamber to the primary chamber, and should the pressure of the air within the primary chamber increase beyond the setting of the relief valve, due to expansion of air as the cylinder warms up from the work it is doing, said excess pressure will be released thru said relief valve.

Of course I do not wish to be limited to the exact details of construction as herein shown as these may be varied within the limits of the appended claims without departing from the spirit of my invention.

Having thus fully described my invention, what I claim as new and useful is:

1. In combination, a cylinder, a piston in said cylinder to divide the latter into primary and auxiliary chambers, a piston rod carried by the piston passing thru one of the ends of the cylinder, said piston rod having a tapered portion intermediate its ends whereby when said tapered portion is within the opening thru the end of the cylinder thru which the piston rod passes a space will be provided for the passage of air into the auxiliary chamber, means to pack the piston rod and a spring controlled passageway thru the piston thru which air may pass from the auxiliary chamber to the primary chamber as the area of the auxiliary chamber is decreased.

2. The structure set forth in claim 1 wherein the cylinder is provided with a spring controlled inlet valve and a spring controlled relief valve, each communicating with the primary chamber of said cylinder.

3. In combination, a cylinder, a piston in said cylinder to divide the latter into primary and auxiliary chambers, a piston rod carried by the piston passing thru one of the ends of the cylinder, said piston rod having a longitudinal slot formed therein whereby when said longitudinal slot is within the opening in the end of the cylinder thru which the rod passes, a space will be formed for the passage of air into the auxiliary chamber, means to pack the piston rod and a spring controlled passageway thru the piston thru which air may pass from the auxiliary chamber to the primary chamber as the area of the auxiliary chamber is decreased.

4. The structure set forth in claim 3 wherein the cylinder is provided with a spring controlled inlet valve and a spring controlled relief valve, each communicating with the primary chamber of said cylinder.

In testimony whereof, I have hereunto affixed my signature.

THOMAS MORINELLI.